United States Patent [19]
Johnsen

[11] Patent Number: 5,165,285
[45] Date of Patent: Nov. 24, 1992

[54] DRIVING DEVICE

[76] Inventor: Anders Johnsen, Alderbäcken 35, 781 93 Gälve, Sweden

[21] Appl. No.: 768,768
[22] PCT Filed: Mar. 30, 1990
[86] PCT No.: PCT/SE90/00206
 § 371 Date: Oct. 9, 1991
 § 102(e) Date: Oct. 9, 1991
[87] PCT Pub. No.: WO90/12222
 PCT Pub. Date: Oct. 18, 1990

[30] Foreign Application Priority Data

Apr. 10, 1989 [SE] Sweden .................. 8901266

[51] Int. Cl.$^5$ ............................................. F16H 47/00
[52] U.S. Cl. ........................................ 74/730.1; 125/14
[58] Field of Search ............. 74/730.1, 732.1; 125/14; 83/591, 639.1

[56] References Cited

U.S. PATENT DOCUMENTS

| | | | |
|---|---|---|---|
| 2,888,841 | 6/1959 | Peras | 74/732.1 X |
| 2,926,551 | 3/1960 | Howard | 74/732.1 X |
| 3,722,497 | 3/1993 | Hiestand et al. | 125/14 |
| 3,880,017 | 4/1975 | Miyao et al. | 74/730.1 X |
| 4,797,025 | 1/1989 | Kennedy | 125/14 X |
| 4,836,494 | 6/1989 | Johnsen et al. | 125/14 X |
| 4,848,845 | 7/1989 | Kennedy | 125/14 X |

Primary Examiner—Dirk Wright
Attorney, Agent, or Firm—Cohn, Powell & Hind

[57] ABSTRACT

A driving device in particular for sawing machines comprises two hydraulically rotatable members (23, 24), which are rotationally connected to each other and one of which is adapted to transmit driving power to a shaft (4). The second rotatable member (24) is connected to a first gear (25) so as to be secured against relative rotation thereto, said first gear being in driving force transmitting relation to a second gear (26), which likewise is arranged to transmit driving power to the shaft. Means (27) are provided to make the device operate in either one of at least two operational states, in a first of which the first member (23) drives the shaft in rotation whereas the second gear (26) and the shaft are free to rotate relative to each other and in a second of which the second gear (26) drives the shaft in rotation whereas the first member (23) and the shaft are free to rotate relative to each other.

10 Claims, 4 Drawing Sheets

DRIVING DEVICE

FIELD OF THE INVENTION

This invention is related to a driving device according to the preamble of claim 1. The driving device is preferably intended to put a saw blade connected to the axle in rotation. Furthermore, it is preferred that the rotatable members form parts of a hydraulic motor in that they are capable of being put into rotation by actuation by means of a hydraulic fluid. The rotatable members preferably form gears in engagement with each other A device of the nature defined in the introduction is disclosed in the Swedish patent 8700255-6. In this prior device, one of the gears is always rotationally fixedly connected to the axle so that one single transmission ratio is possible.

In sawing machines of the nature discussed, there is a need for using sawing blades having different diameters in dependence upon the saw cut depth aimed at. Sawing blades having a large diameter require a lower number of revolutions than sawing blades having a small diameter. One must therefore in the known device adjust the hydraulic fluid flow when changing between saw blades having different diameters. In other known machines designs have been chosen so that in such cases an exchange of hydraulic motor occurs instead. The latter is laborious as well as time and cost consuming.

Gear hydraulic motors according to the Swedish patent 8700255-6 have a very favourable relation power/weight as long as the number of revolutions is relatively high, in practice above about 1000 revolutions/minute. However, the efficiency decreases markedly with reduced number of revolutions. Saw blade speeds as low as 400-1000 revolutions/minute may come in question with saw blades having a large diameter. This means a very unfavorable efficiency compared with the number of revolutions of over 1000 revolutions/minute which with the same gear motors may be used for saw blades having a small diameter. It follows from this that it is not suitable to carry out variation of the number of revolutions by adjusting the hydraulic fluid flow. There are, however, other hydraulic motor types having a high efficiency also with low numbers of revolutions but the weight of these motors is discouragingly high.

SUMMARY OF THE INVENTION

The object of the present invention is to provide a driving device, the design of which should be such that it enables driving of the axle with at least two different transmission ratios. A specific aim is to design the device so that it obtains a possibility for these two different transmission ratios without the device becoming heavy or bulky in an inconvenient degree.

This object it primarily obtained according to the invention by providing the device with the features first of all defined in the characterizing portion of claim 1. Preferable developments of the device according to the invention, in particular concerning the means for making the device operate according to either of at least two operational states, are defined in the dependent claims.

BRIEF DESCRIPTION OF THE DRAWINGS

With reference to the enclosed drawings a more close description of an embodiment example of the invention will follow hereinafter. In the drawings.

DETAILED DESCRIPTION OF A PREFERRED EMBODIMENT

Figure 1:
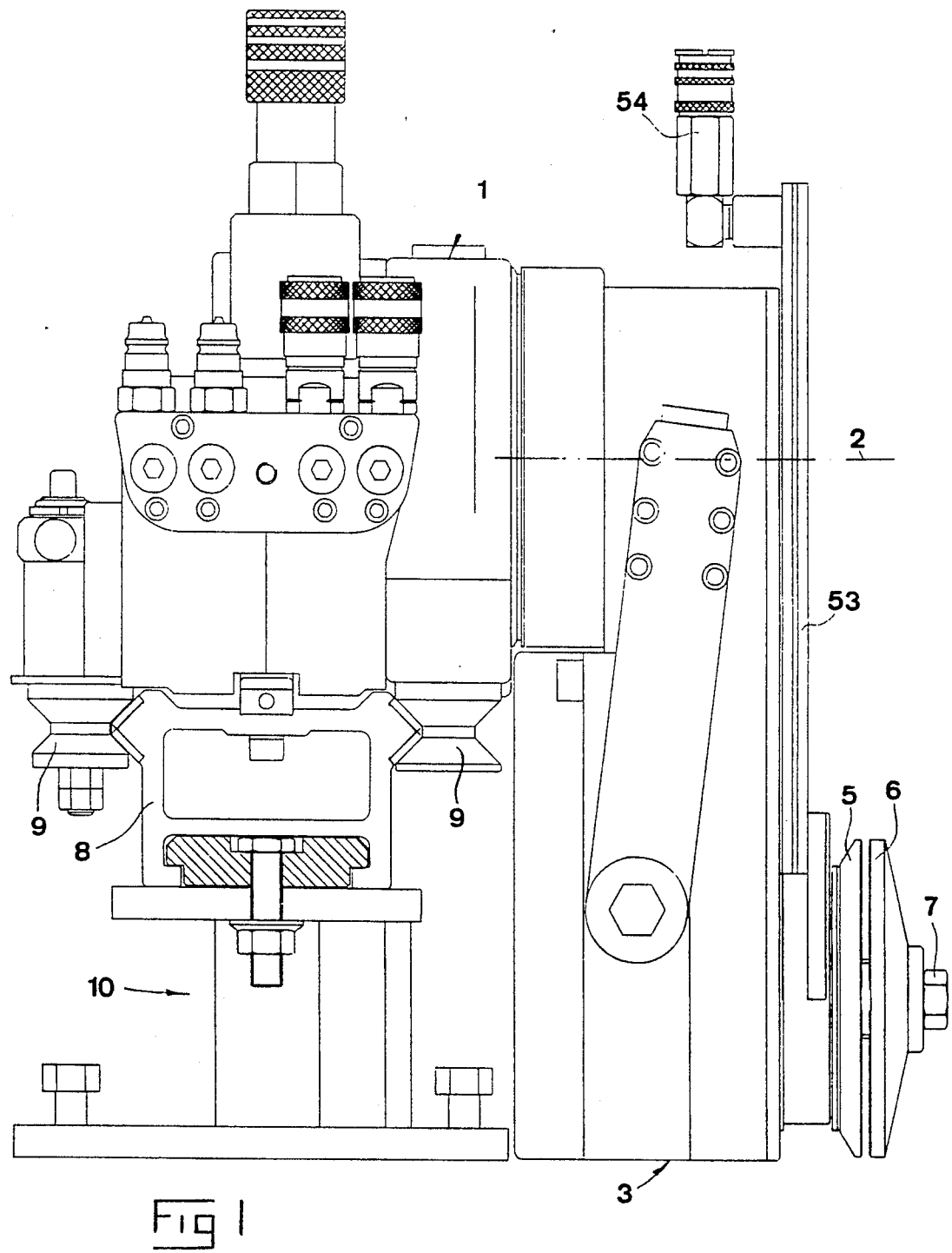
FIG. 1 is a side view of a sawing machine comprising the driving device, according to the invention.

The sawing machine illustrated in the drawings comprises a body 1 and an arm 3 rotatable in relation to the body about an axis 2. An axle 4 in the form of a saw shaft is arranged on the arm 4, said saw shaft being rotatably supported about an axis spaced from the axis 2 of rotation of the arm 3 and generally parallel thereto. At one end of the shaft 4 there is attached a mounting plate 5, against which a saw blade may be placed. A further mounting plate 6 is securable to the shaft 4 by means of a locking screw 7 so that a saw blade may be attached between plates 5 and 6. The screw 7 engages by means of a threaded portion in a hole arranged in the shaft, said hole being interiorly threaded at least adjacent to the extreme end of the shaft.

The body 1 of the sawing machine has the character of a carriage intended to be displaceable along a rail 8. For this purpose body 1 comprises suitable wheels 9 for contacting rail 8. It is diagrammatically illustrated in FIG. 1 that rail 8 is intended to be secured to an underlayer, in which a saw cut is to be produced, by means of suitable securing means 10.

Figure 2:
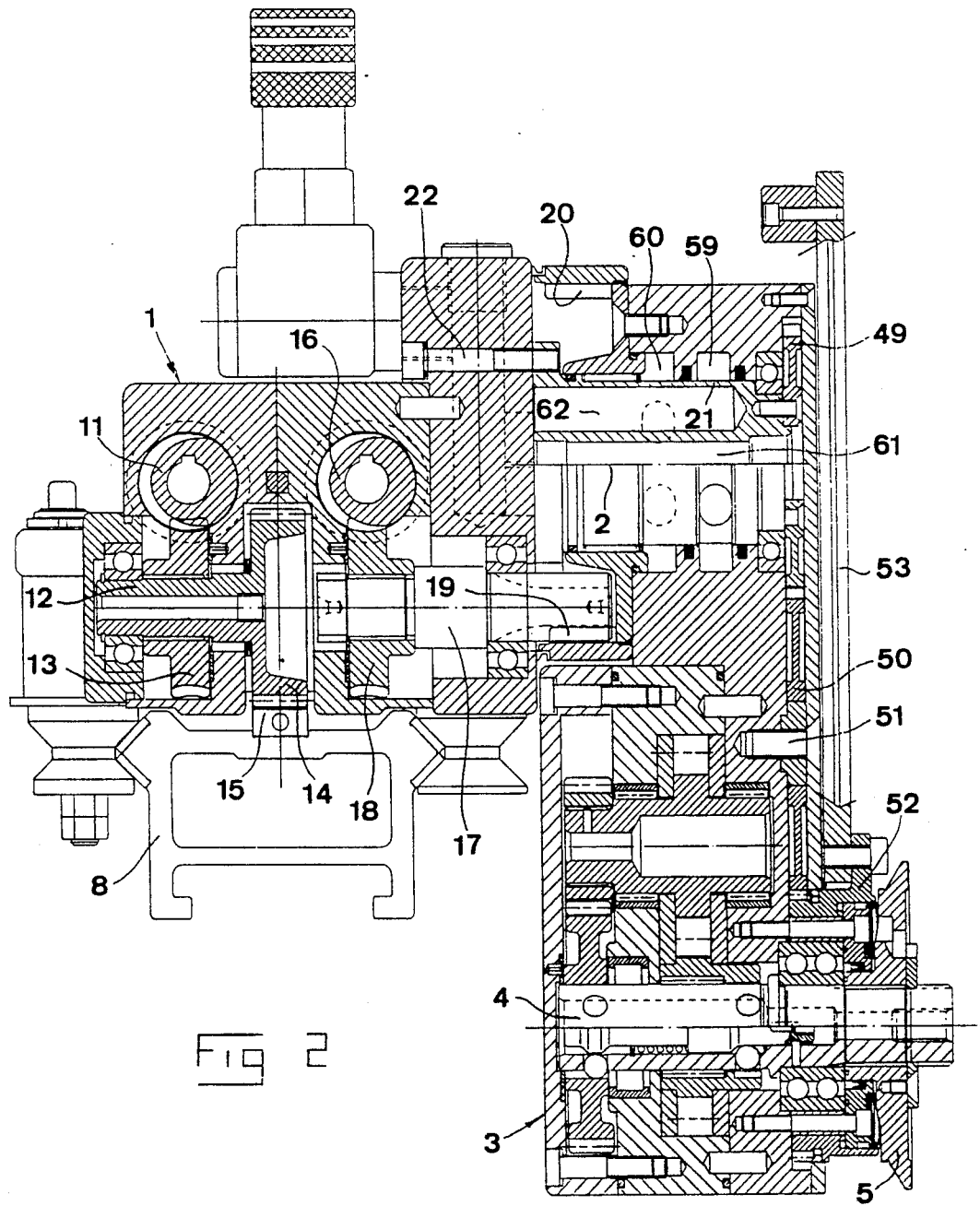
FIG. 2 is a cross section through the sawing machine illustrated in FIG. 1.

As is most clearly apparent from FIG. 2, body 1 may comprise a worm gear 11, which may be driven by hand or motor and which is in a driving engagement with a worm wheel 13 arranged on a axle 12 and secured against rotation relative thereto. The axle 12 comprises a gear 14, the peripherical teeth of which engage with a cog way 15 arranged on rail 8 so that machine body 1 is displaceable along rail 8 by rotating worm gear 11 in the desired direction.

A second worm gear 16 is arranged on body 1, said worm gear engaging with a worm wheel 18 connected to a further axle 17 and secured against rotation relative thereto. The axle 17 comprises at its end to the right in FIG. 2 peripherically arranged teeth 19 engaging with an internal cog way 20 rigidly connected to arm 3. By rotating worm gear 16 in one direction or the other, arm 3 may accordingly be rotated about axis 2 relative to body 1.

The axis of rotation 2 is formed by a concrete axle 21, around which the base portion of arm 3 extends. Axle 21 projects outwardly from the body and is secured thereto against relative rotation by means of a number of annularly disposed screws 22.

A suitable saw cut depth may accordingly be adjusted by adjusting arm 3 into a suitable rotational position in relation to body 1 and the length of the saw cut may be defined by displacing body 1 and accordingly arm 3 along rail 8 in the desired extent.

Figure 3:
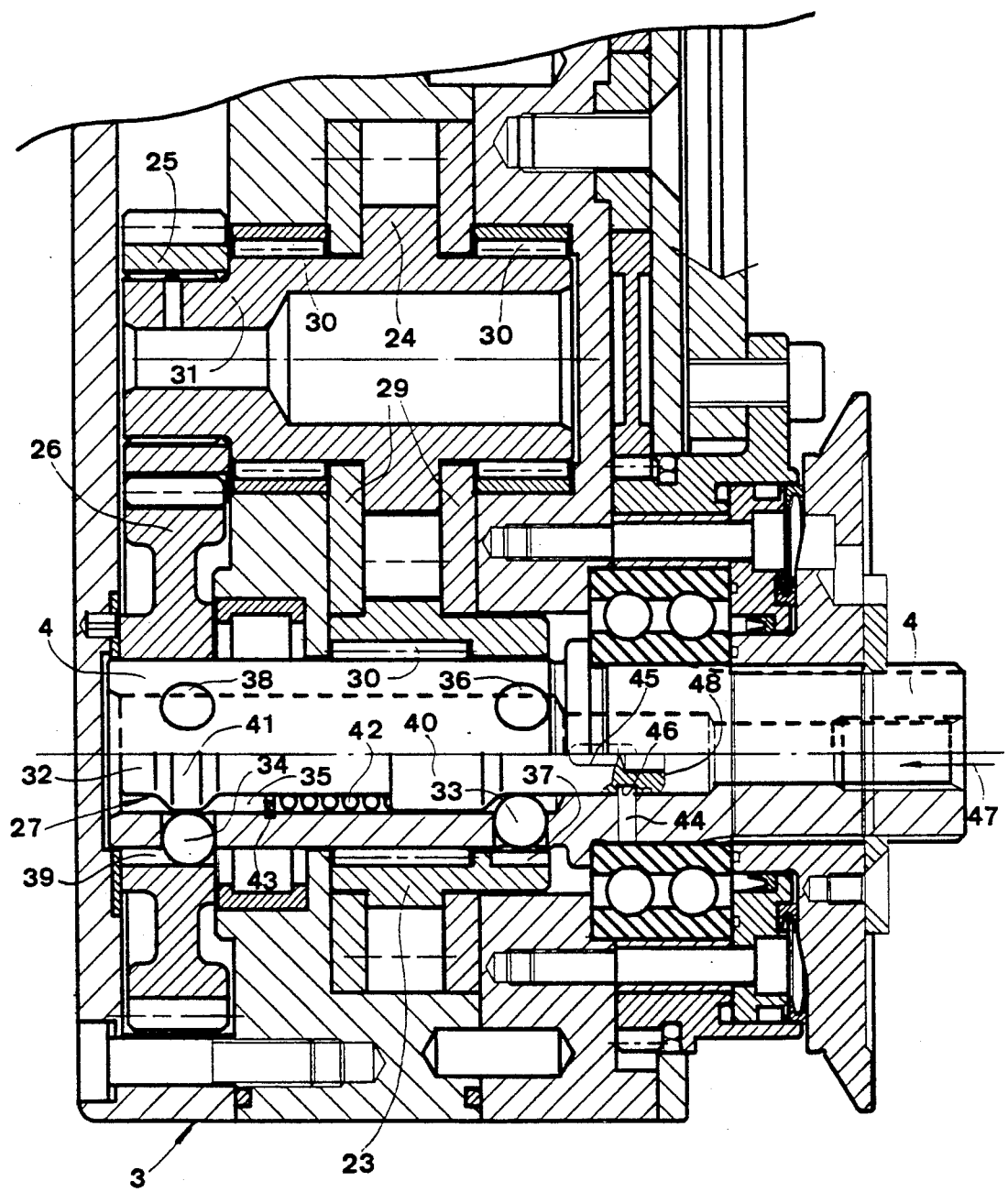
FIG. 3 is an enlarged view illustrating a portion of the sawing machine according to FIG. 2 in section.
Figure 4:
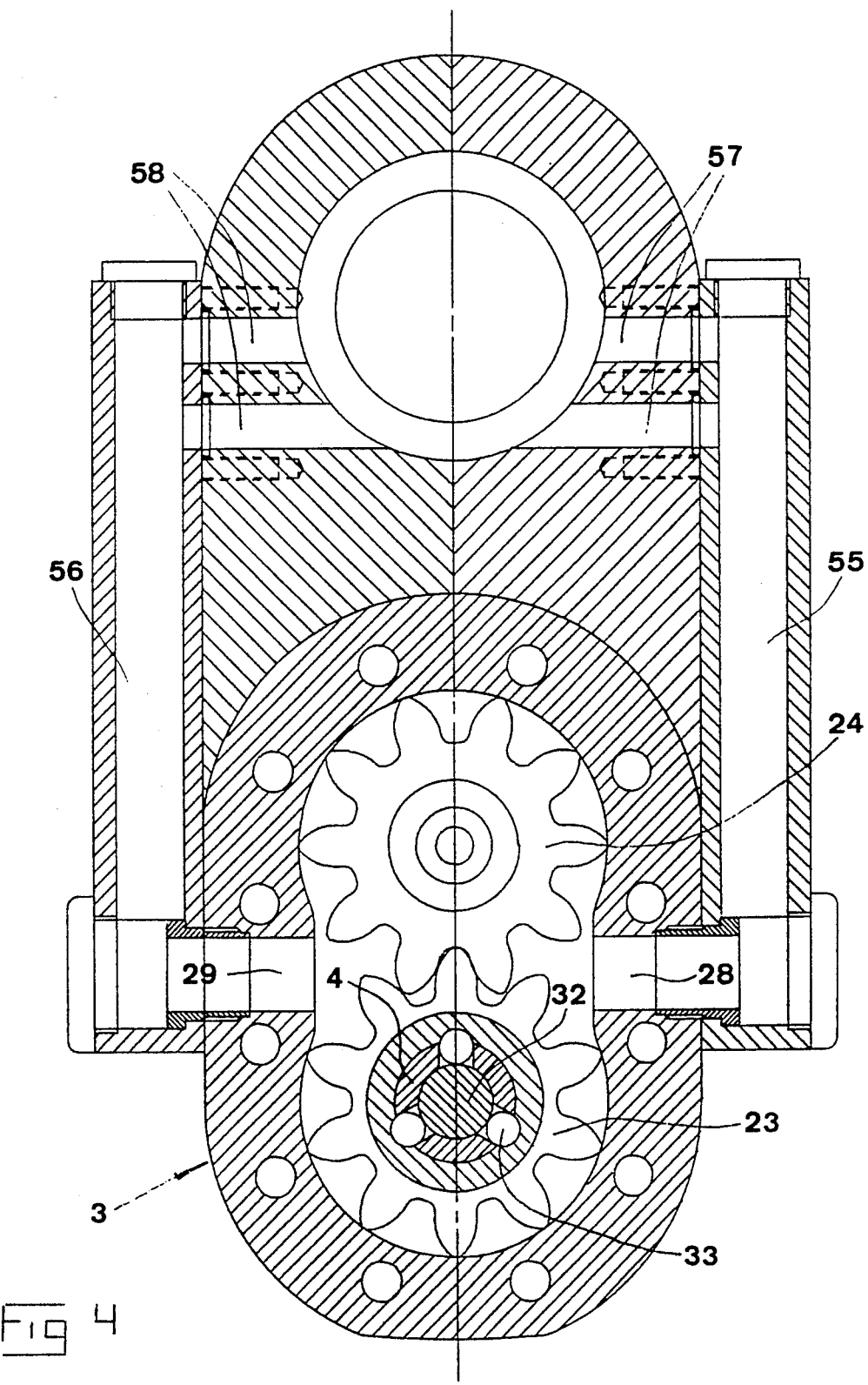
FIG. 4 is a diagrammatical section through a rotatable arm of the sawing machine, the section extending perpendicularly to the plane of the drawing according to FIG. 2 and parallel to the plane of rotation of the arm.

The driving device according to the invention appears more closely from FIGS. 3 and 4 and comprises two rotatable members 23 and 24, which are rotationally connected to each other and one 23 of which is adapted to transmit driving power to shaft 4. The second rotatable member 24 is connected to a first gear 25 and secured against relative rotation thereto, said first gear being in driving power transmitting direct engagement with second gear 26, which likewise is adapted to transmit driving power to shaft 4. Means 27 are provided to make the device operate in either one of at least two operational states, in a first of which the member 23 drives shaft 4 in rotation whereas gear 26 and shaft 4 are free to rotate relative to each other and in a second of which gear 26 drives shaft 4 in rotation whereas member 23 and shaft 4 are free to rotate relative to each other.

The rotatable components 4 and 23-26 all have, in the embodiment, their axes of rotation orientated generally parallel.

The rotatable members 23 and 24 form parts of a hydraulic motor in that they are capable of being put into rotation by actuation by means of a hydraulic fluid. It appears from FIG. 4 that members 23, 24 have the character of gears engaging with each other. The gears are located in a chamber in arm 3 and on opposite sides of the engagement area of the gears there is arranged a supply 28 and a discharge 29 opening for hydraulic fluid. On the passage thereof through the chamber the gears 23, 24 will be put into rotation.

As appears from FIG. 3 gears 23 and 24 are supported axially and radially by means of axial bearings 29 and radial bearings 30. Gear 23 is radially journalled relative to shaft 4.

As appears from FIG. 4 gears 23 and 24 have the same diameter. However, gear 25 has a smaller diameter than gear 26, which means that when shaft 4 is driven via gear 24 the axle section 31 rigidly carrying gear 24, gear 25 and gear 26, the driving of shaft 4 will be geared down relative to the driving situation present when shaft 4 is driven by and interlocked to gear 23 against relative rotation thereto.

The means 27 is formed by a control arrangement adapted to interlock, in the first operational state, gear 23 and shaft 4 against relative rotation whereas gear 26 is disengaged from shaft 4 and to interlock, in the second operational state, gear 26 and shaft 4 against relative rotation whereas gear 23 is disengaged from shaft 4.

The control arrangement 27 comprises a moveable control member 32 arranged to actuate, in a first position, first locking members 33 to interlock gear 23 and shaft 4 and to actuate, in a second position, second locking members 34 to interlock gear 26 and shaft 4. The control member 32 is preferably moveable axially relative to shaft 4. The control member is arranged at least partially within shaft 4, which accordingly has an internal cavity 35.

The locking members 33, 34 are formed by locking bodies, e.g. balls. The locking members 33 may for instance be three in number and the same is applicable for the locking members 34. The locking members 33 are in their locking positions received in spaces formed by cavities 36, 37 in shaft 4 and in gear 23. The locking members 34 are in their locking positions received in spaces formed by cavities 38, 39 in shaft 4 and in gear 26.

The control member 32 comprises cams 40, 41 extending about the control member and arranged to actuate locking members 33, 34 to and retain them in their locking positions. At the sides of these cams 40, 41 the control member comprises portions having a smaller diameter and being arranged to allow the locking members to leave their locking positions.

It is illustrated in FIG. 3 that control member 32 is in such a position that locking members 33 are located out of locking engagement with gear 23 so that accordingly the gear and shaft 4 may rotate freely relative to each other. On the contrary, it is illustrated in FIG. 3 that cam 41 actuates locking members 34 radially outwardly into cavities 39 of gear 26 at the same time as locking members 34 are partially received in cavities 38 of shaft 4, for what reason locking members 34 interlock gear 26 and shaft 4 against relative rotation. On hydraulic fluid supply to the chamber housing gears 23 and 24, the hydraulic fluid will put the gears in rotation, gear 23, however, rotating freely relative to shaft 4. The forces exerted on the gears are transmitted via axle 31 to gear 25 and therefrom to gear 26, which finally delivers its rotational movement to shaft 4 since the latter and gear 26 are interlocked against relative rotation. In the situation described gear 23 will rotate more rapidly than shaft 4 so that accordingly a gearing down situation is at hand. This operational case is suitable for saw blades having a large diameter.

If the slide like control member 32 is displaced to the right in FIG. 3, cam 40 will actuate locking members 33 to project into cavities 37 of gear 23 and retain them therein so that accordingly gear 23 and shaft 24 become interlocked against relative rotation. Cam 41 will at the same time be displaced to the right of cavities 38 of shaft 4 so that locking members 34 are allowed to leave cavities 39 in gear 26 while moving radially inwardly, which occurs when rotation is initiated the next time. Gear 26 and shaft 4 will then accordingly be disengaged from each other. In this operational situation hydraulic fluid supply to the chamber housing gears 23 and 24 will give rise to rotation of the gears and this rotation will be communicated by gear 23 to shaft 24 interlocked against relative rotation to gear 23. Gear 26 will be rotated by means of gear 25 but will rotate more slowly than gear 23 and shaft 24 so that accordingly a direct transmission driving situation is at hand. This situation is suitable for driving saw blades having relatively small diameter with a high number of revolutions.

The control member 32 is in the embodiment under influence of a spring 42, e.g. a screw compression spring, which surrounds the control member and which with one end thereof abuts against a shoulder thereon and with the other end thereof abuts against an abutment 43 secured relative to shaft 4. The spring 42 actuates control member 32 to the right in FIG. 3. Means are provided to retain the control member in either one of its two positions. Said retaining means comprise a "bayonet" locking device comprising a pin 44, which is secured in shaft 4 and projects into its internal cavity, and a groove arranged in the external surface of control member 32, said groove comprising an axial portion 45 and a portion 46 extending in the circumferential direction of the control member and adjoining to portion 45. When control member 32 is to be brought into its second position by displacement to the right in FIG. 3, the control member is rotated until pin 44 enters the axial groove portion 45. Spring 42 is then allowed to displace the control member until pin 44 enters into contact with the end of groove portion 45. The control member 32 is retained in this position by means of spring 42, which accordingly also can be considered to be included in these retaining means. The rotation described of the control member is carried out by means of a tool or a key, which from the end of shaft 4 adjacent to the saw blade is introduced in the direction of arrow 47 into the internal cavity of the shaft and is designed so as to interact with a corresponding formation in the adjacent end surface 48 of control member 32 so as to be locked for rotation relative thereto. The key may for instance comprise a cross sectionally polygonal end portion fitting into a corresponding cross sectionally polygonal recess in end surface 48.

When control member 32 again is to be brought into its position illustrated in FIG. 3, the key is moved into engagement with control member 32 and the latter is then by means of the key displaced to the left in FIG. 3 while compressing spring 42 until pin 44 is located opposite to groove portion 46 extending in the circumferential direction of control member 32, at which time the control member is rotated by means of the key until pin 44 reaches the end of groove portion 46 remote from groove portion 45. At that end the groove portion 46 may comprise a widening in the axial direction of control member 32, pin 44 seating in said widening, the spring 42 causing control member 32 to be actuated so that pin 44 cannot leave this seat. In this way inadvertent release due to vibrations and the like is ensured. A number of analogous designs well known per se within the bayonet locking technique may be used in this regard.

In a way which is more closely described in the applicant's Swedish patent 8700257 a gear 49 may be secured against rotation relative to the axle 21, about which arm 3 is rotatable, said gear being concentric to axle 21. This gear 49 comprises a peripherical toothrim in engagement with a peripherical toothrim on a further gear 50, which is rotatably journalled on arm 3 about an axle pin 51 (see in particular FIG. 2). An element 52 having the character of a sleeve surrounds shaft 4 and is concentric therewith. Element 52 is rotatably journalled and comprises a peripherical toothrim in engagement with the peripherical toothrim of gear 50. A holder 53 for a blade cover is attached to element 52, said blade cover having the character of a hood partially surrounding the saw blade, said hood being applied on the holder 53 after mounting of the saw blade to arm 3. Gears 49 and 50 will cause rotation of element 52 and accordingly the blade cover holder 53 on rotation of arm 3 about axle 21 and more specifically in such a way that rotation of arm 3 in one direction causes rotation of element 52 with the same angle but in opposite direction. As appears from FIG. 1 in particular means 54 for supplying lubricating and/or cooling fluid to the saw blade may be arranged on holder 53.

It appears from FIG. 4 that external conduit sections 55, 56 are located externally on the sides of arm 3, said conduit sections communicating with hydraulic fluid openings 28, 29. These conduit sections 55, 56 communicate at their ends turned away from openings 28, 29 with openings 57 and 58 respectively provided in the arm. These openings 57 and 58 communicate each with a groove 59 and 60 respectively in arm 3 (FIG. 2) and extending about axle 21. The axle 21 comprises a central cavity 61. Radially outwardly of this cavity there are in axle 21 at least two axial bores 62, only one of which appears in FIG. 2. At least one of these bores communicates with one 59 of these grooves through at least one radial opening in axle 21, whereas at least another of these bores communicates with the other groove 60 through at least one radial opening in axle 21. One of these bores communicates via its end located to the left in FIG. 2 with a hydraulic fluid channel arranged in body 1, whereas the other bore communicates with a second fluid channel in the body. Thus, hydraulic fluid may be supplied to the chamber containing gears 23 and 24 through one of these channels, one of the bores, groove 59, openings 57, conduit section 55 and opening 28. Hydraulic fluid may in analogous way be returned from the chamber to a hydraulic fluid tank or the like via opening 29, conduit section 56, openings 58, groove 60, the other bore and another channel in body 1. The direction of flow may of course be reversed by means of a suitable valve so that the supply path described becomes a discharge path and vice versa.

It is evident that the invention is not only limited to the embodiment described but several modifications are conceivable within the scope of the invention.

I claim:

1. A driving device comprising two rotatable members (23, 24), which are rotationally connected to each other and one (23) of which is adapted to transmit driving power to an axle (4), the rotatable members (23, 24) forming parts of a hydraulic motor, characterized in that the second rotatable member (24) is connected to a first gear (25) and fixed for rotation therewith, said first gear being in drive force transmitting relation to a second gear (26), which likewise is adapted to transmit driving power to the axle (4), and that means (27) are provided to make the device operate in either one of at least two operational states, in a first of which the first rotatable member (23) drives the axle (4) in rotation whereas the second gear (26) and the axle are free to rotate relative to each other and in a second of which the second gear (26) drives the axle in rotation whereas the first rotatable member (23) and the axle (4) are free to rotate relative to each other.

2. A device according to claim 1, characterized in that said means (27) comprises a control arrangement adapted to interlock, in the first operational state, the first rotatable member (23) and the axle (4) for rotation with each other, whereas the second gear (26) is disengaged from the axle, and to interlock, in the second operational state, the second gear (26) and the axle (4) for rotation with each other, whereas the first rotatable member (23) is disengaged from the axle.

3. A device according to claim 2, characterized in that the control arrangement (27) comprises a movable control member (32) adapted to actuate, in a first position, first locking members (33) to interlock the first rotatable member (23) and the axle (4) and to actuate, in a second position, second locking members (34) to interlock the second gear (26) and the axle.

4. A device according to claim 3, characterized in that the control member (32) is arranged at least partially within the axle (4).

5. A device according to claim 3 or 4, characterized in that the control member (32) is movable axially relative to the axle (4).

6. A device according to any of claims 3 or 4, characterized in that the locking members (33, 34) comprise locking bodies, for instance balls, which in their locking positions are received in spaces formed by cavities (36, 37; 38, 39) in the axle (4) as well as in the first rotatable member (23) and the second gear (26) respectively.

7. A device according to claim 6, characterized in that the control member (32) comprises cams (40, 41)

adapted to actuate the locking members (33, 34) to and retain them in their locking positions and that the control member (32) at the sides of these cams comprises portions adapted to allow the locking members to leave their locking positions.

8. A device according to any of claims 1-4, characterized in that the axle (4) forms a drive shaft for a rotatable tool, in particular a sawing tool.

9. A device according to claim 8, characterized in that it is arranged on an arm (3) of a sawing machine, said arm being rotatable relative to a body (1) of the sawing machine about a second axle (2), which is generally parallel to and radially separated from the first mentioned axle.

10. A device according to any of claims 1-4, characterized in that the first and second gears (25, 26) have different diameters and are arranged to, on equal numbers of revolution of the second rotatable member (24), put the first mentioned axle (4) in rotation with a different number of revolutions than that which is obtained by driving the axle by means of the first rotatable member (23).

* * * * *